US008605562B2

(12) United States Patent
Pyun et al.

(10) Patent No.: US 8,605,562 B2
(45) Date of Patent: Dec. 10, 2013

(54) APPARATUS AND METHOD FOR RECORDING MICRO-HOLOGRAM

(75) Inventors: Kyungsuk Pyun, Seoul (KR); Andrew Putilin, Moscow (RU); Alexander Morozov, Moscow (RU); Gee-young Sung, Daegu (KR); Chil-sung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/569,871

(22) Filed: Aug. 8, 2012

(65) Prior Publication Data

US 2013/0039160 A1   Feb. 14, 2013

(30) Foreign Application Priority Data

Aug. 9, 2011  (RU) ................................ 2011133280
Jan. 18, 2012  (KR) ........................ 10-2012-0005839

(51) Int. Cl.
  *G11B 7/0065*   (2006.01)
(52) U.S. Cl.
  USPC .......................................................... 369/103
(58) Field of Classification Search
  None
  See application file for complete search history.

(56) References Cited

U.S. PATENT DOCUMENTS

| | | | |
|---|---|---|---|
| 5,416,616 A * | 5/1995 | Jenkins et al. | 359/11 |
| 5,519,651 A * | 5/1996 | Redfield | 365/125 |
| 6,088,321 A * | 7/2000 | Yamaji et al. | 369/103 |
| 6,661,548 B2 | 12/2003 | Klug et al. | |
| 6,806,982 B2 | 10/2004 | Newswanger et al. | |
| 7,236,442 B2 * | 6/2007 | Sugiki et al. | 369/103 |
| 7,262,891 B2 | 8/2007 | Brotherton-Ratcliffe et al. | |
| 7,313,072 B2 * | 12/2007 | Tsukagoshi | 369/103 |
| 7,626,913 B2 * | 12/2009 | Usami | 369/103 |
| 7,965,430 B2 * | 6/2011 | Hossfeld et al. | 359/22 |
| 2002/0051419 A1 * | 5/2002 | Itoh et al. | 369/103 |
| 2002/0154589 A1 * | 10/2002 | Tanaka et al. | 369/103 |
| 2003/0156523 A1 * | 8/2003 | Wu et al. | 369/103 |
| 2004/0174797 A1 * | 9/2004 | Tsukagoshi | 369/103 |
| 2005/0237896 A1 * | 10/2005 | Tachibana et al. | 369/103 |
| 2006/0133249 A1 * | 6/2006 | Kogure | 369/53.19 |
| 2006/0233087 A1 * | 10/2006 | Usami | 369/103 |
| 2007/0047420 A1 * | 3/2007 | Yanagihara | 369/103 |
| 2008/0151340 A1 | 6/2008 | Brotherton-Ratcliffe et al. | |

(Continued)

FOREIGN PATENT DOCUMENTS

WO   WO-2005/078533 A1   8/2005

OTHER PUBLICATIONS

Mikhailov et al., "Pulse recording of slanted fringe holograms in DuPont photopolymer", Proc. SPIE, vol. 3294, pp. 132-135, 1998.

*Primary Examiner* — Peter Vincent Agustin
(74) *Attorney, Agent, or Firm* — NSIP Law

(57) ABSTRACT

An apparatus and method for recording a micro-hologram are provided. The micro-hologram recording apparatus includes a first light source configured to emit a first light, the first light being coherent, a first optical system configured to divide the first light into a signal beam and a reference beam, and supply the signal beam and the reference beam to a location on a hologram recording medium, a second light source configured to emit a second light, the second light being incoherent and not interfering with the signal beam and the reference beam, and a second optical system configured to supply the second light to the same location as the signal beam and the reference beam on the hologram recording medium.

20 Claims, 4 Drawing Sheets

(56) References Cited

U.S. PATENT DOCUMENTS

| | | |
|---|---|---|
| 2008/0165654 A1* | 7/2008 | Fukuhara ............... 369/103 |
| 2008/0186830 A1* | 8/2008 | Fukuda ............... 369/103 |
| 2009/0080317 A1* | 3/2009 | Martinez ............... 369/103 |
| 2009/0219596 A1 | 9/2009 | Brotherton-Ratcliffe et al. |
| 2011/0228663 A1* | 9/2011 | Terai et al. ............... 369/103 |
| 2013/0039160 A1* | 2/2013 | Pyun et al. ............... 369/103 |

* cited by examiner

APPARATUS AND METHOD FOR RECORDING MICRO-HOLOGRAM

CROSS-REFERENCE TO RELATED APPLICATIONS

This application claims the benefits under 35 U.S.C. §119 (a) of Korean Patent Application No. 10-2012-0005839, filed on Jan. 18, 2012, in the Korean Intellectual Property Office, and Russian Patent Application No. RU2011133280, filed on Aug. 9, 2011, the entire disclosures of which are incorporated herein by reference for all purposes.

BACKGROUND

1. Field

The following description relates to methods and apparatuses for recording micro-holograms.

2. Description of the Related Art

Holography is a technology involving an interference pattern caused by a signal beam containing a signal beam and a reference beam. The interference pattern is recorded to reproduce the signal as a stereoscopic image. Holography may be used in fields such as recordation and reproduction of stereoscopic images, prevention of forgery and verification of genuine articles, and recordation and reproduction of digital data. In addition, fine interference patterns may be recorded on a flat photosensitive recording film. The recording of the fine interference patterns may be in units of pixels, so that a three-dimensional image may be viewed on a two-dimensional plane.

Micro-holograms may be classified as a rear projection micro-hologram or a reflective micro-hologram. The rear projection micro-hologram may relate to a stereoscopic image contained in light that has been transmitted through a recording film, and the reflective micro-hologram may relate to a stereoscopic image contained in light reflected by a recording film. In another example, the reflective micro-hologram may record and/or reproduce full-color or full-parallax images, and the reflective micro-hologram may represent gradation.

In general, division of a beam emitted from a light source into a signal beam and a reference beam, light-modulation of the signal beam, and irradiation of the signal beam and the reference beam onto the same location on a photosensitive recording film may record image information onto a micro-hologram. Usage of a spatial light-modulator according to an interference pattern calculated by a computer based on an image that is to be finally reproduced from a photosensitive recording film may modulate a signal beam.

In response to recording a micro-hologram, exposure energy applied to a photosensitive recording film may be a significant factor in recording of the micro-hologram. An intensity of light that is irradiated to a photosensitive recording film and exposure time may determine the exposure energy. In order to improve a quality of an image to be reproduced, appropriate amount of exposure energy is to be provided to a photosensitive recording film. In response to an output of laser used as a light source being weak, an exposure time may be increased, and accordingly, a time for recording of a micro-hologram may be increased. In addition, recording of a micro-hologram may be affected by external factors such as vibration. In addition, the manufacturing costs for a micro-hologram recording apparatus may increase, and consumption power may also increase in response to a high output laser being used as the light source.

SUMMARY

According to one aspect, a micro-hologram recording apparatus is provided. The micro-hologram recording apparatus includes a first light source configured to emit a first light, the first light being coherent, a first optical system configured to divide the first light into a signal beam and a reference beam, and supply the signal beam and the reference beam to a location on a hologram recording medium, a second light source configured to emit a second light, the second light being incoherent and not interfering with the signal beam and the reference beam, and a second optical system configured to supply the second light to the same location as the signal beam and the reference beam on the hologram recording medium.

The micro-hologram recording apparatus may further include a substrate on which the hologram recording medium, to which an image is to be recorded, is mounted, and a positioning unit configured to move the substrate according to a recording location on the hologram recording medium.

The first optical system may include a first beam splitter configured to divide light emitted from the first light source into a signal beam and a reference beam, a signal beam transmitting unit configured to modulate the signal beam and supply the modulated signal beam to the hologram recording medium, and a reference beam transmitting unit configured to supply the reference beam to the same location as the signal beam on the hologram recording medium.

The signal beam transmitting unit may include a beam extender configured to extend a beam diameter of a signal beam emitted from the first beam splitter, a spatial light modulator (SLM) configured to modulate the extended signal beam according to an image that is to be recorded to the hologram recording medium and load image information to the signal beam, a Fourier transform optical system configured to perform a Fourier transform on the signal beam, in which the image information is loaded, to focus the signal beam on the hologram recording medium, and a second beam splitter configured to supply the signal beam from the beam extender to the SLM and supply the signal beam that is reflected by the SLM to the Fourier transform optical system.

The reference beam transmitting unit may include at least two mirrors.

The reference beam transmitting unit may be formed such that a cross-section of the reference beam on the hologram recording medium corresponds to a cross-section of the signal beam.

The SLM may be a reflective SLM.

The second optical system may include at least one mirror configured to reflect the second light toward the hologram recording medium, and the second optical system may be formed such that the second light travels along a path different from paths of the reference beam and the signal beam.

The second optical system may include a mirror configured to reflect the second light toward the first beam splitter, and the second optical system may share the reference beam transmitting unit and the signal beam transmitting unit with the first optical system such that the second light is divided to travel along respective paths of the reference beam and the signal beam.

The second optical system may include a third beam splitter disposed on a path of the reference beam between the first beam splitter and the hologram recording medium, and the second optical system may share a path of the reference beam transmitting such that the second light travels along the path of the reference beam.

The second light source may face the third beam splitter.

The second optical system may include a fourth beam splitter disposed between the first beam splitter and the beam extender and a mirror configured to reflect the second light toward the fourth beam splitter. The second optical system may share the signal beam transmitting unit with the first optical system such that the second light travels along a path of the signal beam.

The signal beam transmitting unit may include a beam extender configured to extend a beam diameter of a signal beam emitted from the first beam splitter, a transmissive spatial light modulator (SLM) configured to modulate the extended signal beam according to an image to be recorded to the hologram recording medium and load image information to the signal beam, a Fourier transform optical system configured to perform a Fourier transform on the signal beam, to which the image information is loaded, and focus the signal beam on the hologram recording medium, and a mirror configured to reflect the signal beam emitted from the beam extender to the transmissive SLM.

The second light source may be a laser or a light-emitting diode (LED) configured to emit light that does not interfere with the signal beam and the reference beam.

The hologram recording medium may include a recording layer and a protection layer coated on a surface of the recording layer so as to protect the recording layer, and the second light may have a spatial coherence length less than twice a thickness of the protection layer.

With exposure energy corresponding to a lower limit of a linear recording zone of the hologram recording medium being E1, and exposure energy corresponding to an upper limit of the linear recording zone of a hologram recording medium being E2, the second light source may be configured to apply the exposure energy E1 to the hologram recording medium, and the first light source may be configured to apply exposure energy of 0 to (E2−E1) to the hologram recording medium.

The beam extender may include a refractive lens.

The second light may be reflected by a single mirror before being supplied to the same location.

As another aspect, a method of recording a hologram is provided. The method includes dividing a first light into a signal beam and a reference beam, the first light being coherent, loading image information to the signal beam, supplying the reference beam and the signal beam, to which the image information is loaded, to a location on the hologram recording medium, and supplying a second light that does not interfere with the signal beam and the reference beam, to the same location on the hologram recording medium as the signal beam and the reference beam, the second light being incoherent.

The hologram recording medium may include a recording layer and a protection layer that is coated on a surface of the recording layer so as to protect the recording layer, and the second light may have a spatial coherence length less than twice a thickness of the protection layer.

The first light may be emitted from a first light source, the first light being coherent, and the second light may be emitted from a second light source that is separate from the first light source, the second light being incoherent.

With exposure energy corresponding to a lower limit of a linear recording zone of the hologram recording medium being E1, and exposure energy corresponding to an upper limit of the linear recording zone of the hologram recording medium being E2, the second light source may be configured to apply the exposure energy E1 to the hologram recording medium, and the first light source may be configured to apply exposure energy of 0 to (E2−E1) to the hologram recording medium.

As another aspect, a recording device is provided. The recording device includes a micro-hologram recording unit including a first optical system configured to divide a first light, which is coherent, into a signal beam and a reference beam, and supply the signal beam and the reference beam to a location on a hologram recording medium, and a second optical system configured to supply a second light, which is incoherent, to the same location as the signal beam and the reference beam on the hologram recording medium.

Other features and aspects may be apparent from the following detailed description, the drawings, and the claims.

Figure 1:
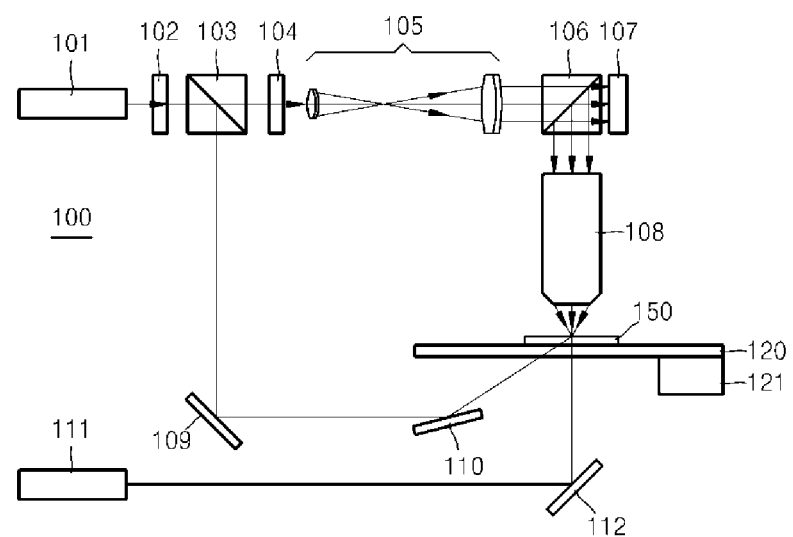
FIG. 1 is an example illustrating a schematic view of a structure of a micro-hologram recording apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is an example of schematic view illustrating a structure of a micro-hologram recording apparatus 100. Referring to FIG. 1, the micro-hologram recording apparatus 100 may include a first light source 101 configured to emit coherent light, a first optical system configured to divide the coherent light emitted from the first light source 101 into a signal beam and a reference beam, modulate the signal beam, and supply both the signal beam and the reference beam to a location on a hologram recording medium 150, a second light source 111 configured to emit incoherent light, and a second optical system configured to supply the incoherent light onto the hologram recording medium 150. The coherent light is in phase with one another, and the incoherent light is not in phase with one another. The incoherent light does not interfere with the signal beam and the reference beam. In addition, the micro-hologram recording apparatus 100 may further include a substrate 120, and a positioning unit 121 that moves the substrate 120 according to a recording location on the hologram recording medium 150. The substrate 120 may have mounted the hologram recording medium 150, to which an image is to be recorded.

The first light source 101 may include, for example, a laser configured to emit coherent light. The first light source 101 may further include other elements that may adjust, for example, an intensity of output light or waveforms of output light. Elements that may adjust the intensity of the output light or the waveforms of output light include a continuous wave, a pulse wave, etc.

The first optical system may include a first beam splitter 103 configured to divide a light emitted from the first light source 101 into a signal beam and a reference beam, a signal beam transmitting unit configured to modulate the signal beam and supply the modulated signal beam to the hologram recording medium 150, and a reference beam transmitting unit configured to supply the reference beam to the hologram recording medium 150. The first beam splitter 103 may be, for example, a semi-transmissive mirror. In this case, the first beam splitter 103 may transmit about 50% of incident light through to supply the transmitted light to the signal beam transmitting unit, and reflect the other 50% of the incident light to supply the reflected light to the reference beam transmitting unit. However, the current example is not limited thereto, and a ratio of the signal beam to the reference beam may vary according to examples. In addition, the first optical system may further include a filter 102 disposed between the first light source 101 and the first beam splitter 103. The filter 102 may be, for example, a band pass filter configured to transmit only light having a predetermined bandwidth. The band pass filter may filter out light that falls outside the predetermined bandwidth.

The signal beam transmitting unit may include a beam extender 105 that extends a beam diameter of a signal beam, a spatial light modulator (SLM) 107 configured to modulate a signal beam based on an image to be recorded to the hologram recording medium 150 and to load image information to the signal beam, a second beam splitter 106 configured to transmit a signal beam incident from the beam extender 105 to the SLM 107 and to transmit a signal beam reflected by the SLM 107 to the hologram recording medium 150, and a Fourier transform optical system 108 configured to perform a Fourier transform on the signal beam which contains the image information and to focus the Fourier transformed signal beam on the hologram recording medium 150.

The beam extender 105 may extend a signal beam to, for example, a size corresponding to an effective light modulation region of the SLM 107, and the beam extender 105 may be formed of a plurality of optical devices including a refractive lens. The beam splitter 106 may transmit, for example, an extended signal beam and supply the transmitted signal beam to the SLM 107. Also, the beam splitter 106 may reflect the signal beam reflected by the SLM 107 and supply the reflected signal beam to the Fourier transform optical system 108. As another aspect, the current example is a non-limiting example, and according to examples, the second beam splitter 106 may be configured to reflect the extended signal beam and supply the extended signal beam to the SLM 107. Also, the second beam splitter 106 may be configured to transmit the signal beam reflected by the SLM 107. In this case, the SLM 107 may be disposed on a top surface of the second beam splitter 106. For example, the second beam splitter 106 may be a semi-transmissive mirror. The semi-transmissive mirror may simply reflect a portion of the incident light and transmit through the remainder of the incident light. According to examples, the second beam splitter 106 may be a polarization beam splitter. The polarization beam splitter may transmit or reflect light based on a polarization direction of incident light. In this case, a polarization plate 104 may transmit only light of a predetermined polarization direction. The polarization plate 104 may be disposed between the first beam splitter 103 and the second beam splitter 106. In addition, although not shown in FIG. 1, a quarter wavelength plate may also be disposed between the second beam splitter 106 and the SLM 107.

The reference beam divided by the first beam splitter 103 may be transmitted by the reference beam transmitting unit onto the hologram recording medium 150. In FIG. 1, although just two mirrors 109 and 110 are illustrated as being part of the reference beam transmitting unit, an actual reference beam transmitting unit may have a more complicated structure including more than just two mirrors 109 and 110. For example, the reference beam transmitting unit may include mirrors 109 and 110 configured to rotate and move so that the reference beam may be incident on the hologram recording medium 150 at a desired incident angle. As another example, the reference beam transmitting unit may be configured so that the reference beam may be incident on the hologram recording medium 150 at the same location as the signal beam. In addition, the reference beam transmitting unit may be configured so that a cross-section of a reference beam and a cross-section of a signal beam match each other or correspond to each other on the hologram recording medium 150.

In the micro-hologram recording apparatus 100, the signal beam transmitted through the first beam splitter 103 is light-modulated by the SLM 107, and then based on the usage of the Fourier transform optical system 108, the signal beam may be focused on the hologram recording medium 150. In addition, the reference beam reflected by the first beam splitter 103 may be reflected by the mirrors 109 and 110, and then the reflected reference beam may be transmitted through the substrate 120 to be incident to a lower portion of the hologram recording medium 150. Subsequently, the signal beam and the reference beam may meet on the hologram recording medium 150, and in this example, an interference pattern generated may be recorded on the hologram recording medium 150 due to interference of the signal beam and the reference beam. As an example, light that has transmitted through the first beam splitter 103 may become a signal beam, and light that is reflected by the first beam splitter 103 may become a reference beam, as shown in FIG. 1. As another example, light that has been transmitted through the first beam splitter 103 may become a reference beam, and light that is reflected by the first beam splitter 103 may become a signal beam.

In addition, according to the current example, to further increase recording efficiency on the hologram recording medium 150, additional light may be irradiated on the hologram recording medium 150. The second light source 111 being separate from the first light source 101 may supply the additional light to the hologram recording medium 150. The second light source 111 is not limited. For example, the second light source 111 may be a laser or a light-emitting diode (LED). In response to the second light source 111 being a laser, the second light source 111 may emit light that has a different wavelength from light emitted from the first light source 101. In another example, the second light source 111 may emit light having the same wavelength as light emitted from the first light source 101, but the light emitted from the second light source 111 has a lower spatial coherence than the light emitted from the first light source 101. In addition, in response to the second light source 111 being a LED, the second light source 111 may emit light having a spectral bandwidth that does not include a wavelength of the light emitted by the first light source 101 or light having a spectral bandwidth including a wavelength of the light emitted by the first light source 101. In other words, as long as the light emitted from the second light source 111 does not interfere with a signal beam and a reference beam emitted by the first light source 101, any type of light source may be used as the second light source 111.

The second optical system may supply light emitted from the second light source 111 onto the hologram recording medium 150. A mirror 112, illustrated in FIG. 1, may be related to the second optical system. As another aspect, a second optical system may have a more complicated structure than the second optical system illustrated in FIG. 1. For example, the second optical system may include a plurality of mirrors and lenses, and the mirror 112 may rotate and move so that light emitted from the second light source 111 may be incident on the hologram recording medium 150. The light incident on the hologram recording medium 150 may be incident on a desired location and at an incident angle. As an example, the second optical system may be configured such that light emitted from the second light source 111, the signal beam and the reference beam are incident on the same location on the hologram recording medium 150. According to the current example, the mirror 112 reflects light emitted from the second light source 111, and then the reflected light is transmitted through the second substrate 120 to be incident to a lower portion of the hologram recording medium 150.

Figure 2:
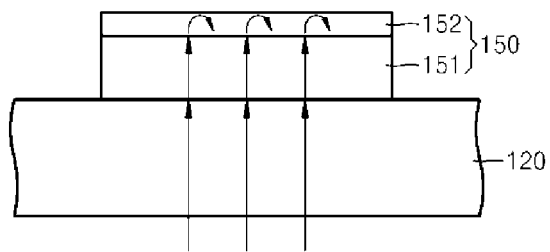
FIG. 2 is a partial magnified cross-sectional view illustrating an example of a hologram recording medium illustrated in FIG. 1.

FIG. 2 is a partial magnified cross-sectional view of an example of the hologram recording medium 150 in FIG. 1. Referring to FIG. 2, the hologram recording medium 150 may include a recording layer 151 and a protection layer 152. The protection layer 152 may be coated on a surface of the recording layer 151 to protect the recording layer 151. The recording layer 151 may be formed of a photosensitive material. As illustrated in FIG. 2, a portion of the light emitted from the second light source 111 substantially completely passes through the substrate 120 and the recording layer 151, and is substantially reflected by the protection layer 152 to re-enter the recording layer 151 again. In this example, interference may be generated between the light reflected by the protection layer 152 and the light transmitted through the recording layer 151. The interference may affect an interference pattern recorded to the recording layer 151 between the signal beam and the reference beam. Accordingly, a spatial coherence length of the light emitted from the second light source 111 may be less than twice a thickness of the protection layer 152 to prevent interference.

Figure 3:
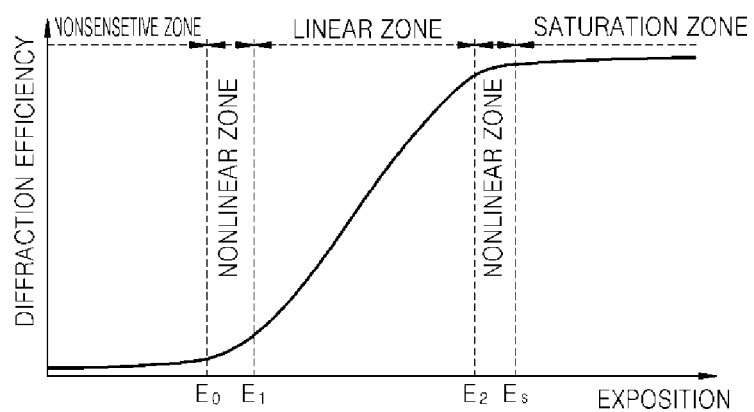
FIG. 3 is a graph illustrating diffraction efficiency of a hologram recording medium with respect to exposure energy in response to an additional incoherent light source not being used in the micro-hologram recording apparatus of FIG. 1.
Figure 4:
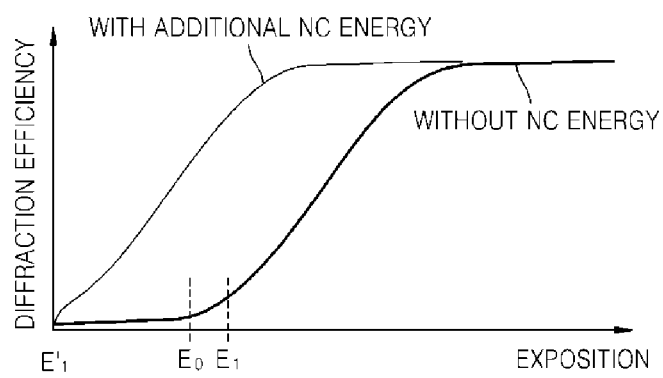
FIG. 4 is a graph illustrating diffraction efficiency of a hologram recording medium with respect to exposure energy in response to an additional incoherent light source being used in the micro-hologram recording apparatus of FIG. 1.

By using the second light source 111, efficiency of a recording of the hologram recording medium 150 may be improved. FIGS. 3 and 4 may relate to graphs illustrating usage of the second light source 111. First, FIG. 3 illustrates a graph of diffraction efficiency of the hologram recording medium 150 with respect to exposure energy in response to the second light source 111 not being used in the micro-hologram recording apparatus 100. The second light source 111 may be an additional incoherent light source. In addition, FIG. 4 illustrates a graph of diffraction efficiency of the hologram recording medium 150 with respect to exposure energy in response to the second light source 111 being used in the micro-hologram recording apparatus 100.

Referring to FIG. 3, in response to the second light source 111 not being used and exposure energy due to light emitted from the first light source 101 being less than E0, the hologram recording medium 150 has a low likelihood of being sensitized. In response to exposure energy between E0 and E1 being applied to the hologram recording medium 150, diffraction efficiency due to an interference pattern recorded to the hologram medium 150 may vary non-linearly. Hereinafter, an exposure energy section between E0 and E1 is defined as "first non-linear recording zone". Also, in response to exposure energy between E1 and E2 being applied to the hologram recording medium 150, diffraction efficiency linearly increases proportionally to the exposure energy. Hereinafter, an exposure energy section between E1 and E2 is defined as a "linear recording zone". In addition, in response to exposure energy being between E2 and ES, diffraction efficiency increases non-linearly. Hereinafter, an exposure energy section between E2 and ES is defined as "second non-linear recording zone". Finally, in response to an application of exposure energy equal to or greater than ES, diffraction efficiency ceases to substantially increase. Hereinafter, an exposure energy section equal to or greater than ES is defined as a "saturation zone".

Thus, in response to recording an interference pattern to the hologram recording medium 150, application of exposure energy in a linear recording zone (i.e., between E1 and E2) to the hologram recording medium 150 based on grey level of an image to be reproduced later. For example, in response to exposure energy corresponding to the lower limit E1 of the linear recording zone being applied to the hologram recording medium 150, little diffraction is generated in the hologram recording medium 150, and thus, the brightness of a reproduced image is relatively high, and in response to exposure energy corresponding to the upper limit E2 of the linear recording zone being applied to the hologram recording medium 150, a large amount of diffraction is generated in the hologram recording medium 150, and thus, the brightness of a reproduced image is relatively low. Accordingly, application of exposure energy between E1 and E2 based on a grey level of an image to be reproduced, rich representation of grey level may be conducted.

In general, controlling light intensity and exposure time may adjust exposure energy applied to the hologram recording medium 150. For example, in response to the first light source 101 emitting a continuous wave, adjusting an intensity of emitted light or an exposure time of the light may adjust desired exposure energy applied to the hologram recording medium 150. In addition, in response to the first light source 101 emitting a pulse wave, an emission frequency of the pulse wave or light intensity may be adjusted. As another aspect, since exposure energy between E1 and E2 may be applied to the hologram recording medium 150 and exposure energy between 0 and E1 is not used, exposure energy may be wasted. As an example, to apply exposure energy E2, a high output laser, which is relatively expensive, may be used as the first light source 101. In addition, an exposure time may be relatively long to obtain a desired exposure energy.

On the other hand, in response to the second light source 111 being used with the first light source 101, in other words, in response to light emitted from the first light source 101 (i.e., a signal beam and a reference beam) and light emitted from the second light source 111 being incident on the hologram recording medium 150 at substantially the same time, exposure energy supplied by the first light source 101 may decrease as shown in the graph of FIG. 4. The second light source 111 may be a non-coherent light source. For example, in response to the second light source 111 supplying exposure energy corresponding to E1, the first light source 101 may apply exposure energy corresponding to 0 to (E2−E1) to the hologram recording medium 150. Accordingly, a relatively inexpensive, low output laser may be used as the first light source 101. Also, usage of the relatively inexpensive, low output laser may also shorten exposure time. Also, even in response to the second light source 111 being used, a slope of a diffraction efficiency curve remains fairly consistent in a zone where diffraction efficiency varies linearly, and thus, grey level representation ability may be maintained. In response to sensitivity of the hologram recording medium 150 being increased in order to reduce exposure energy and exposure time, the slope of the diffraction efficiency curve may abruptly increase, and thus, representation of various grey level may be difficult. As another aspect, according to the examples, the above-described problem may not occur.

Figure 5:
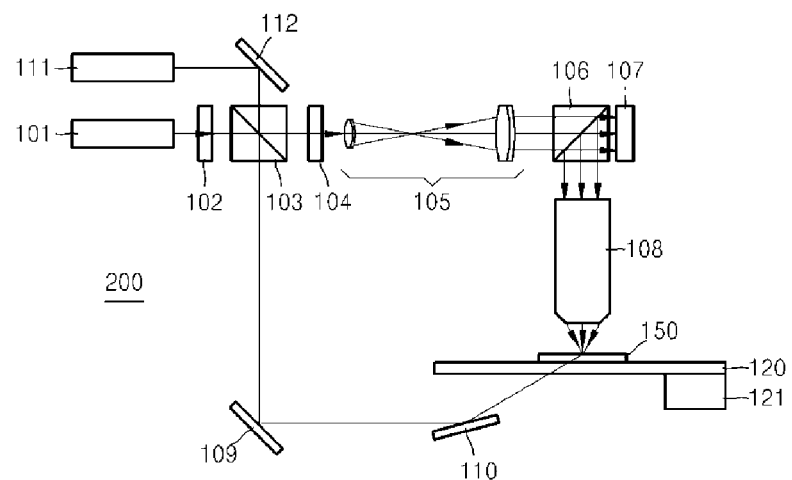
FIG. 5 is a schematic view illustrating an example of a structure of a micro-hologram recording apparatus.
Figure 6:
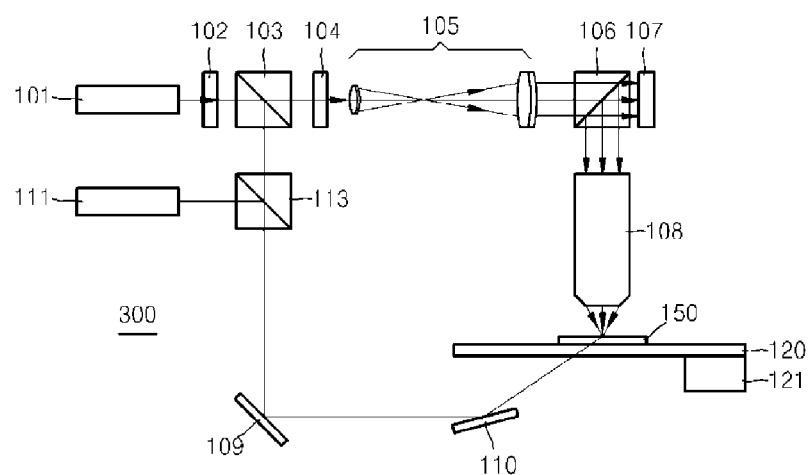
FIG. 6 is a schematic view illustrating another example of a structure of a micro-hologram recording apparatus.
Figure 7:
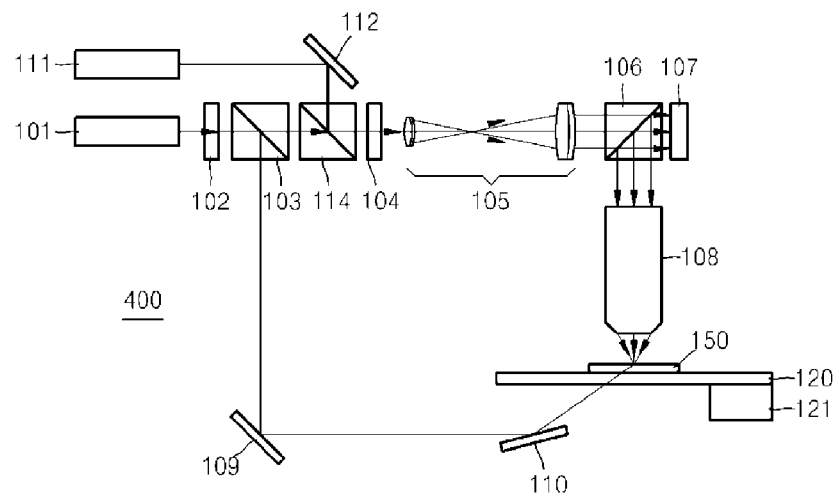
FIG. 7 is a schematic view illustrating another example of a structure of a micro-hologram recording apparatus.

Referring to FIG. 1, the first optical system for the first light source 101 and the second optical system for the second light source 102 may be completely separate, and thus, light emitted from the first light source 101 and light emitted from the second light source 111 may travel different paths. As another aspect, a micro-hologram recording apparatus may have light emitted from the second light source 111 travel with a signal beam, a reference beam, or any combination thereof by combining a portion of the second optical system with the first optical system. FIGS. 5 through 7 illustrate various examples of micro-hologram recording apparatuses.

FIG. 5 is a schematic view illustrating another example of a structure of a micro-hologram recording apparatus 200.

First, referring to FIG. 5, the micro-hologram recording apparatus 200 may include a first light source 101, a first optical system, a second light source 111 and a second optical system. The first light source 101 emits coherent light. The first optical system may be configured to divide the coherent light emitted from a first light source 101 into a signal beam and a reference beam, modulate the signal beam, and supply both the signal beam and the reference beam to a location on a hologram recording medium 150. The second light source 111 emits incoherent light that does not interfere with the signal beam and the reference beam. The second optical system that supplies the incoherent light onto the hologram recording medium 150. The first light source 101 and the first optical system may have similar structures to the structures illustrated in FIG. 1 above.

According to the example of FIG. 5, light emitted by the second light source 111 may not be directly incident on the hologram recording medium 150 but may be incident on the first beam splitter 103. For example, light emitted from the second light source 111 may be incident on a first incident surface. The first incident surface may be adjacent to a second incident surface to which light emitted from the first light source 101 is incident. The first beam splitter 103 may include four surfaces, and one of the four surfaces may be the second incident surface where light emitted from the first light source 101 is incident, another surface is the first incident surface, and the other two surfaces may be exit surfaces through which transmitted light and reflected light are emitted, respectively. The light emitted from the second light source 111 may be incident on the remaining second surface of the first beam splitter 103. Referring to FIG. 5, the mirror 112 may be disposed between the first beam splitter 103 and the second light source 111 so that light emitted from the second light source 111 is reflected by the mirror 112 and then is incident on the first beam splitter 103. As another aspect, this is an example, and the second light source 111 may directly face the first beam splitter 103. In this case, the second optical system may share a signal beam transmitting unit and a reference beam transmitting unit of the first optical system.

According to the current example, the first beam splitter 103 may divide light emitted from the second light source 111 into two separate beams, and then the light may be supplied to the hologram recording medium 150 along the signal beam transmitting unit and the reference beam transmitting unit. The second light source 111 may be an incoherent light source, and thus, an interference pattern of a signal beam and a reference beam may not be affected by the light emitted from the second light source 111. According to the current example, the light emitted from the second light source 111 may be accurately supplied to substantially the same location of the hologram recording medium 150 as the signal beam and the reference beam.

FIG. 6 is a schematic view illustrating another example of a structure of a micro-hologram recording apparatus 300.

According to the example illustrated in FIG. 6, light emitted from a second light source 111 travels along a substantially similar path as a reference beam. Referring to FIG. 6, the micro-hologram recording apparatus 300 includes a third beam splitter 113 disposed between a first beam splitter 103 and a first mirror 109 of the reference beam transmitting unit. The third beam splitter 113, the first beam splitter 103 and the first mirror 109 constitute a second optical system, and the second light source 111 faces the third beam splitter 113. The first light source 101 of the micro-hologram recording apparatus 300 and the first optical system may have a substantially similar configuration as those illustrated in FIG. 1. The third beam splitter 113 may transmit a reference beam reflected by the first beam splitter 103, and reflect the light emitted from the second light source 111 so that the light emitted from the second light source 111 travels along the same path as the reference beam. For example, the third beam splitter 113 may be a semi-transmissive mirror or a dichronic mirror that selectively reflects or transmits light based on a wavelength of incident light or along an incident surface of incident light. Although, in FIG. 6, the third beam splitter 113 is illustrated as being disposed between the first beam splitter 103 and the hologram recording medium 150, the third beam splitter 113 may be disposed at any location on the path of a reference beam between the first beam splitter 103 and the hologram recording medium 150. For example, the third beam splitter 113 may be disposed between the mirrors 109 and 110. According to the current example, light emitted from the second light source 111 may travel along a substantially similar path as the reference beam supplied onto the hologram recording medium 150. In this case, the second optical system may share the reference beam transmitting unit of the first optical system.

FIG. 7 is a schematic view illustrating another example of a structure of a micro-hologram recording apparatus 400.

Referring to FIG. 7, light emitted from the second light source 111 may travel along a substantially similar path as a signal beam. Referring to FIG. 7, the micro-hologram recording apparatus 400 includes a fourth beam splitter 114 disposed between a first beam splitter 103 and a beam extender 105 of a signal beam transmitting unit. The fourth beam splitter 114, the first beam splitter 103 and the beam extender 105 may constitute a second optical system. In response to a polarization plate 104 being disposed in front of the beam extender 105 in a light proceeding direction, the fourth beam splitter 114 may be disposed between the first beam splitter 103 and the polarization plate 104. The second light source 111 may directly face the fourth beam splitter 114, or alternatively, as illustrated in FIG. 7, a mirror 112 may be further disposed between the second light source 111 and the fourth beam splitter 114. Thus, the mirror may reflect light to the fourth beam splitter 114. The first light source 101 and the first optical system of the micro-hologram recording apparatus 400 may have a substantially similar structures as those described with reference to FIG. 1 above. The fourth beam splitter 114 may transmit a reference beam reflected by the first beam splitter 103, and reflect the light emitted from the second light source 111 so that the light emitted from the second light source 111 travels along the same path as the reference beam. For example, the fourth beam splitter 114 may be a semi-transmissive mirror or a dichronic mirror that selectively reflects or transmits light based on a wavelength of incident light or along an incident surface of incident light. According to the current example, light emitted from the second light source 111 may travel along a substantially similar path as the reference beam to be supplied to the hologram recording medium 150. In this case, the second optical system may share the reference beam transmitting unit of the first optical system.

Figure 8:
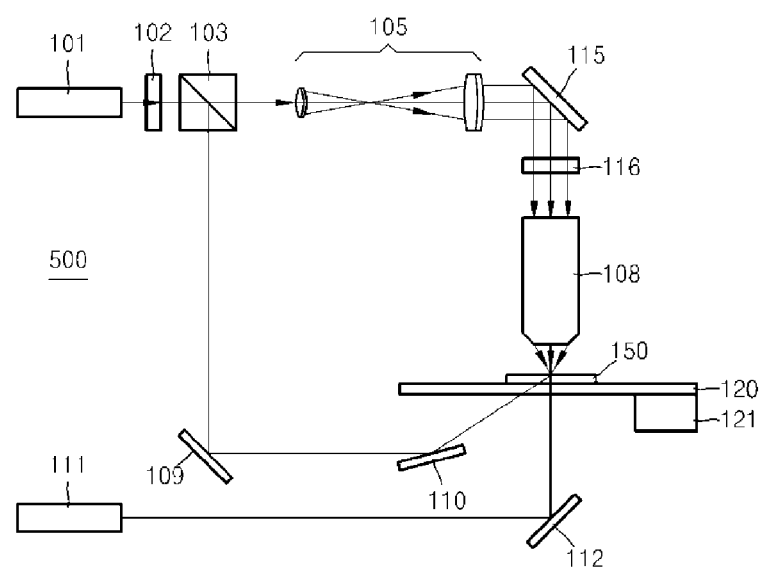
FIG. 8 is a schematic view illustrating a structure of a micro-hologram recording apparatus.

While the micro-hologram recording apparatuses 100, 200, 300, and 400 may use the SLM 107, a transmissive SLM that transmits modulated light may also be used instead of the SLM 107, which reflects modulated light. FIG. 8 is a schematic view illustrating another example of a structure of a micro-hologram recording apparatus 500 in which a transmissive SLM is used. Referring to FIG. 8, the micro-hologram recording apparatus 500 includes a mirror 115 instead of the second beam splitter 106, and a transmissive SLM 116 may be disposed between the mirror 115 and a Fourier transform optical system 108. The transmissive SLM 116 may substitute the reflective SLM 107. According to the current example, the polarization plate 104 may not be used if the transmissive SLM 116 is used. Compared to the micro-hologram recording apparatus 100 illustrated in FIG. 1, the example of the micro-hologram recording apparatus 500 illustrated in FIG. 8 may be different from the examples of the micro-hologram recording apparatuses 100, 200, 300, and 400 in that the polarization plate 104 is not included, the mirror 115 is used instead of the second beam splitter 106, and the SLM 116 is a transmissive type modulator. The remaining configuration of the micro-hologram recording apparatus 500 may be substantially similar as the micro-hologram recording apparatus 100 illustrated in FIG. 1. The structure of FIG. 8, in which the transmissive SLM 116 is used, may also be used in the micro-hologram recording apparatuses 200, 300, and 400 illustrated in FIGS. 5 through 7.

Recording devices may include a micro-hologram recording device.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A micro-hologram recording apparatus comprising:
a first light source configured to emit a first light, the first light being coherent;
a first optical system configured to divide the first light into a signal beam and a reference beam, and supply the signal beam and the reference beam to a location on a hologram recording medium;
a second light source configured to emit a second light, the second light being incoherent and not interfering with the signal beam and the reference beam; and
a second optical system configured to supply the second light to the same location as the signal beam and the reference beam on the hologram recording medium,
wherein with exposure energy corresponding to a lower limit of a linear recording zone of the hologram recording medium being E1, and exposure energy corresponding to an upper limit of the linear recording zone of the hologram recording medium being E2, the first light source is configured to apply exposure energy of 0 to (E2−E1) to the hologram recording medium, and the second light source is configured to apply the exposure energy E1 to the hologram recording medium.

2. The micro-hologram recording apparatus of claim 1, further comprising:
a substrate on which the hologram recording medium, to which an image is to be recorded, is mounted; and
a positioning unit configured to move the substrate according to a recording location on the hologram recording medium.

3. The micro-hologram recording apparatus of claim 1, wherein the first optical system comprises:
a first beam splitter configured to divide light emitted from the first light source into a signal beam and a reference beam;
a signal beam transmitting unit configured to modulate the signal beam and supply the modulated signal beam to the hologram recording medium; and
a reference beam transmitting unit configured to supply the reference beam to the same location as the signal beam on the hologram recording medium.

4. The micro-hologram recording apparatus of claim 3, wherein the signal beam transmitting unit comprises:
a beam extender configured to extend a beam diameter of a signal beam emitted from the first beam splitter;
a spatial light modulator (SLM) configured to modulate the extended signal beam according to an image that is to be recorded to the hologram recording medium and load image information to the signal beam;
a Fourier transform optical system configured to perform a Fourier transform on the signal beam, in which the image information is loaded, to focus the signal beam on the hologram recording medium; and
a second beam splitter configured to supply the signal beam from the beam extender to the SLM and supply the signal beam that is reflected by the SLM to the Fourier transform optical system.

5. The micro-hologram recording apparatus of claim 4, wherein the reference beam transmitting unit comprises at least two mirrors.

6. The micro-hologram recording apparatus of claim 5, wherein the reference beam transmitting unit is formed such that a cross-section of the reference beam on the hologram recording medium corresponds to a cross-section of the signal beam.

7. The micro-hologram recording apparatus of claim 4, wherein the SLM is a reflective SLM.

8. The micro-hologram recording apparatus of claim 3, wherein the second optical system comprises at least one mirror configured to reflect the second light toward the hologram recording medium, and the second optical system is formed such that the second light travels along a path different from paths of the reference beam and the signal beam.

9. The micro-hologram recording apparatus of claim 3, wherein the second optical system comprises a mirror configured to reflect the second light toward the first beam splitter, and the second optical system shares the reference beam transmitting unit and the signal beam transmitting unit with the first optical system such that the second light is divided to travel along respective paths of the reference beam and the signal beam.

10. The micro-hologram recording apparatus of claim 3, wherein the second optical system comprises a third beam splitter disposed on a path of the reference beam between the first beam splitter and the hologram recording medium, and the second optical system shares a path of the reference beam such that the second light travels along the path of the reference beam.

11. The micro-hologram recording apparatus of claim 10, wherein the second light source faces the third beam splitter.

12. The micro-hologram recording apparatus of claim 4, wherein the second optical system comprises a fourth beam splitter disposed between the first beam splitter and the beam extender and a mirror configured to reflect the second light toward the fourth beam splitter, wherein the second optical system shares the signal beam transmitting unit with the first optical system such that the second light travels along a path of the signal beam.

13. The micro-hologram recording apparatus of claim 3, wherein the signal beam transmitting unit comprises:
    a beam extender configured to extend a beam diameter of a signal beam emitted from the first beam splitter;
    a transmissive spatial light modulator (SLM) configured to modulate the extended signal beam according to an image to be recorded to the hologram recording medium and load image information to the signal beam;
    a Fourier transform optical system configured to perform a Fourier transform on the signal beam, to which the image information is loaded, and focus the signal beam on the hologram recording medium; and
    a mirror configured to reflect the signal beam emitted from the beam extender to the transmissive SLM.

14. The micro-hologram recording apparatus of claim 1, wherein the second light source is a laser or a light-emitting diode (LED) configured to emit light that does not interfere with the signal beam and the reference beam.

15. The micro-hologram recording apparatus of claim 1, wherein the hologram recording medium comprises a recording layer and a protection layer coated on a surface of the recording layer so as to protect the recording layer, and the second light has a spatial coherence length less than twice a thickness of the protection layer.

16. The micro-hologram recording apparatus of claim 4, wherein the beam extender includes a refractive lens.

17. The micro-hologram recording apparatus of claim 1, wherein the second light is reflected by a single mirror before being supplied to the same location.

18. A method of recording a hologram, the method comprising:
    dividing a first light into a signal beam and a reference beam, the first light being coherent;
    loading image information to the signal beam;
    supplying the reference beam and the signal beam, to which the image information is loaded, to a location on a hologram recording medium; and
    supplying a second light that does not interfere with the signal beam and the reference beam, to the same location on the hologram recording medium as the signal beam and the reference beam, the second light being incoherent,
    wherein with exposure energy corresponding to a lower limit of a linear recording zone of the hologram recording medium being $E1$, and exposure energy corresponding to an upper limit of the linear recording zone of the hologram recording medium being $E2$, the first light is irradiated to the hologram recording medium with exposure energy of 0 to $(E2-E1)$, and the second light is irradiated to the hologram recording medium with the exposure energy $E1$.

19. The method of claim 18, wherein the hologram recording medium comprises a recording layer and a protection layer that is coated on a surface of the recording layer so as to protect the recording layer, and the second light has a spatial coherence length less than twice a thickness of the protection layer.

20. The method of claim 18, wherein the first light is emitted from a first light source, the first light being coherent, and the second light is emitted from a second light source that is separate from the first light source, the second light being incoherent.

* * * * *